May 29, 1928.
A. LAUGHLIN, JR
1,671,731
METHOD AND APPARATUS FOR THE MANUFACTURE OF TUBES
Filed March 16, 1925  4 Sheets-Sheet 1
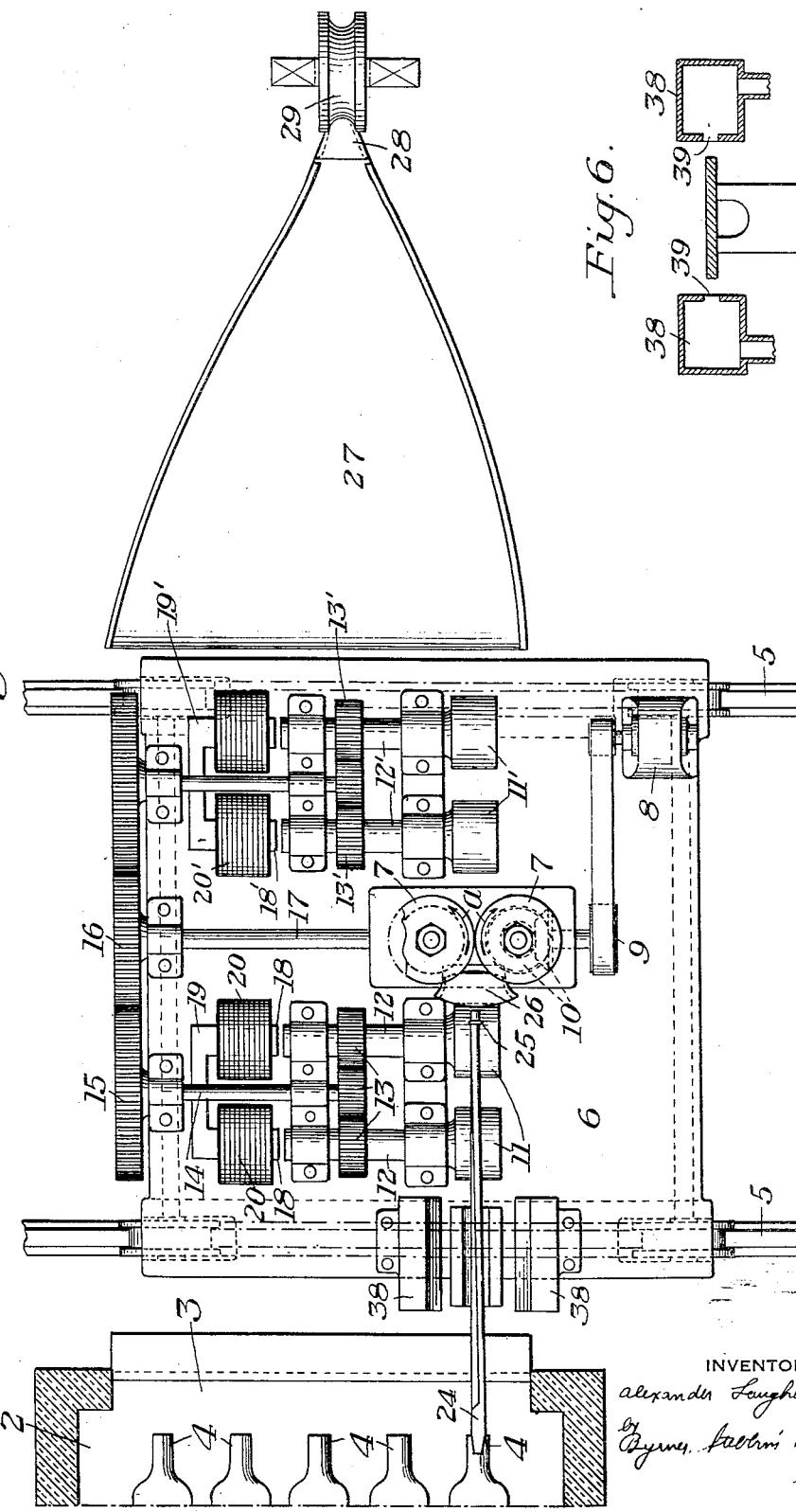
INVENTOR

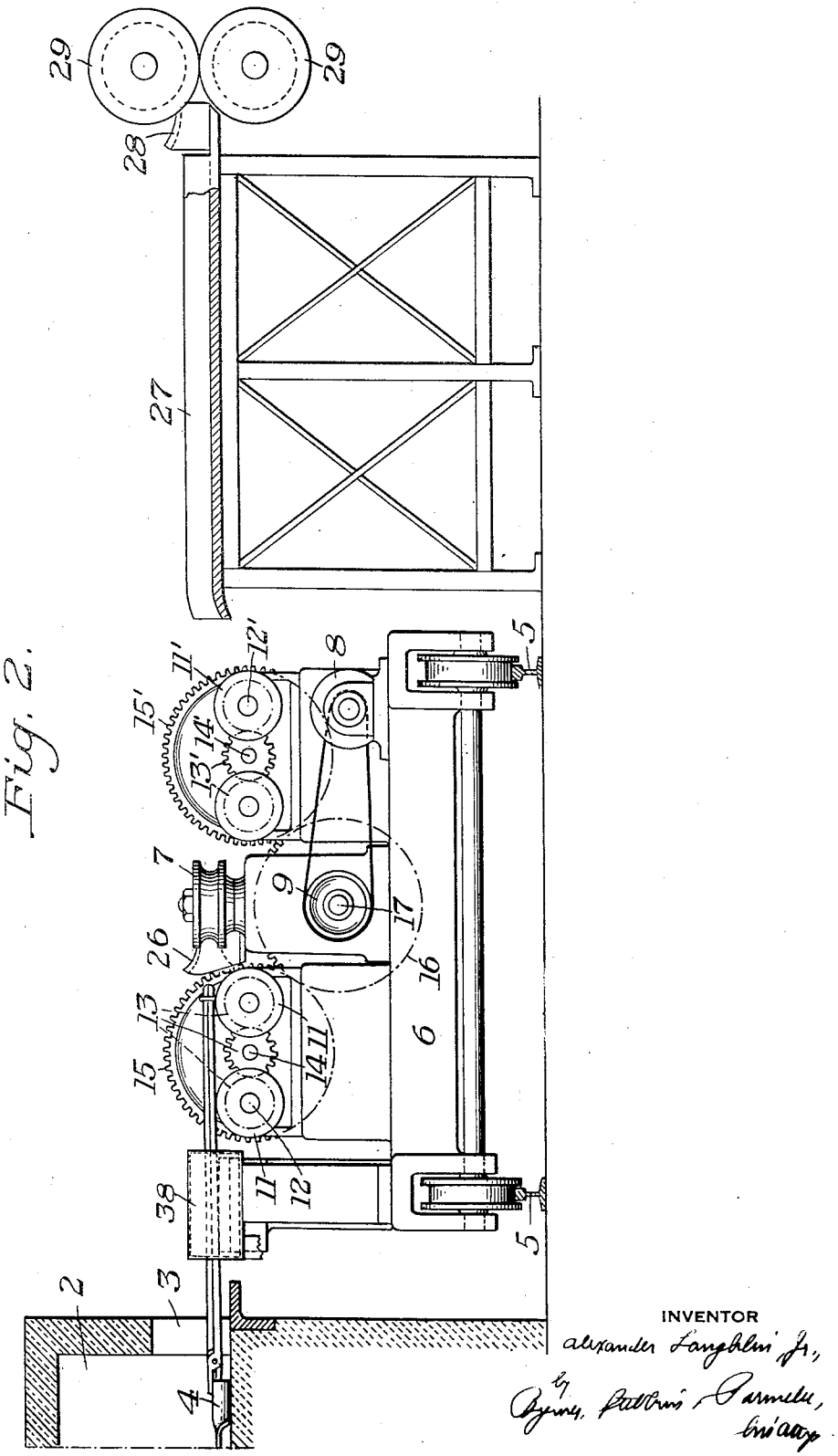

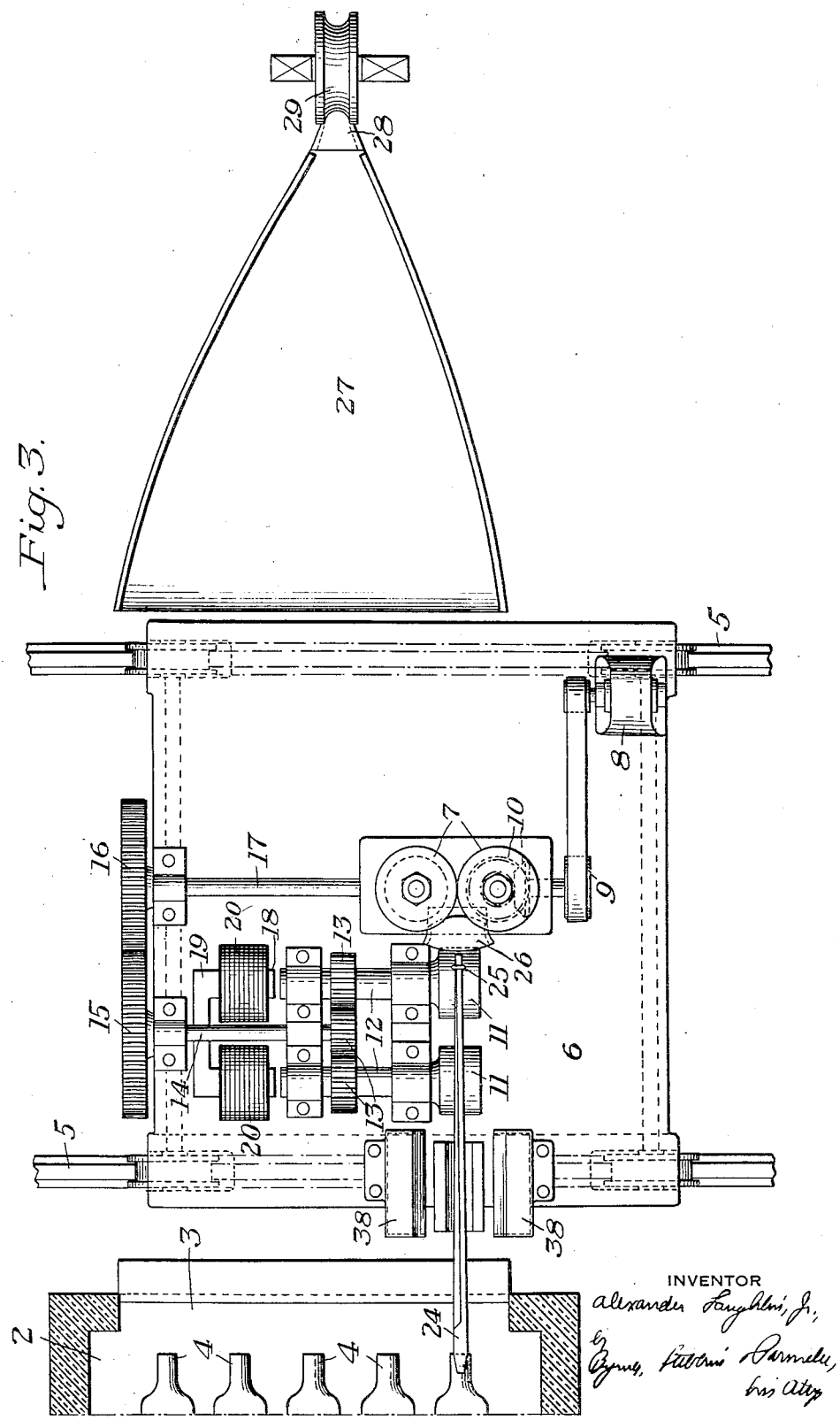

May 29, 1928.
A. LAUGHLIN, JR
1,671,731
METHOD AND APPARATUS FOR THE MANUFACTURE OF TUBES
Filed March 16, 1925    4 Sheets-Sheet 4
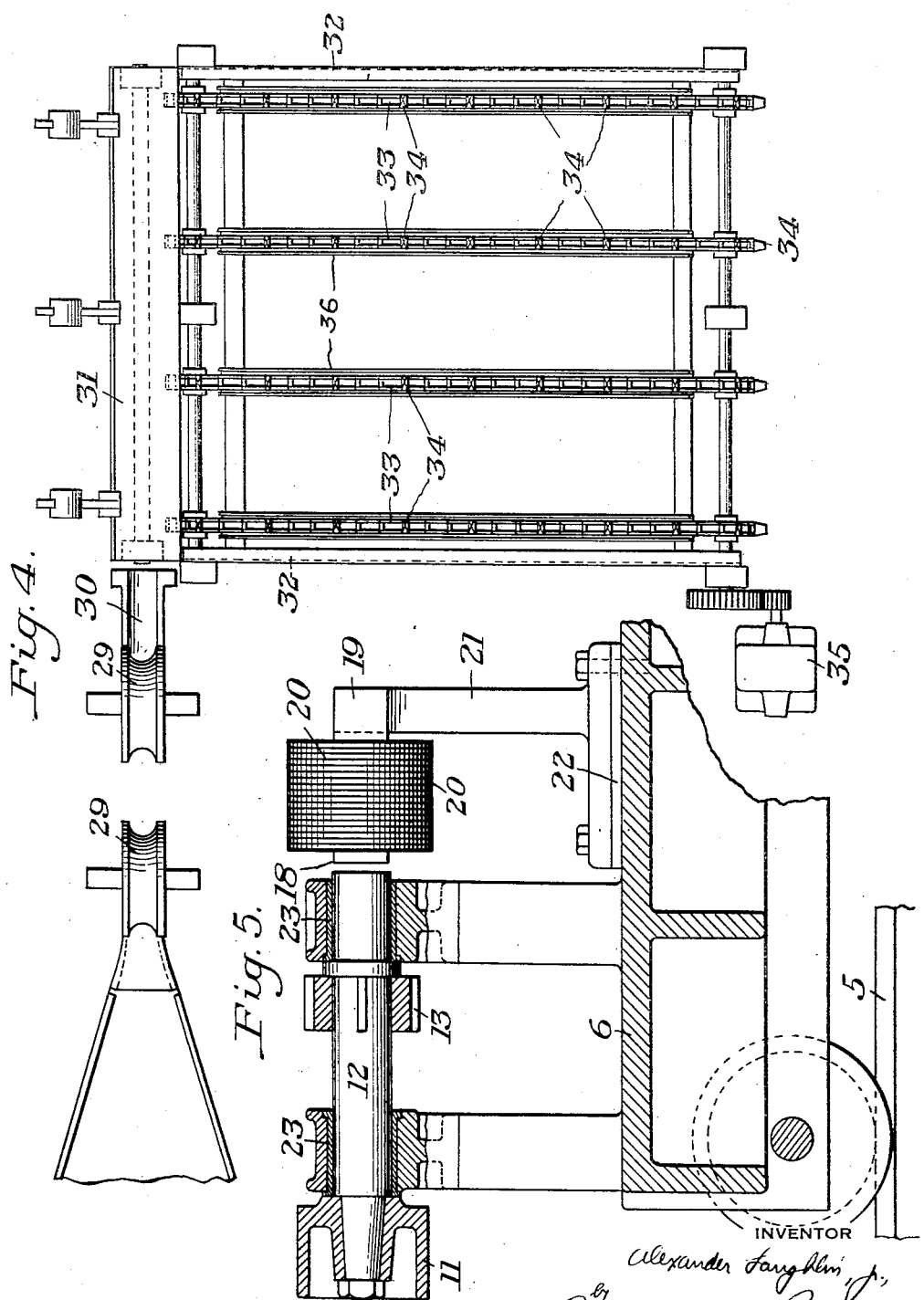

Patented May 29, 1928.

1,671,731

UNITED STATES PATENT OFFICE.

ALEXANDER LAUGHLIN, JR., OF PITTSBURGH, PENNSYLVANIA; MARGARET M. LAUGHLIN AND THE UNION TRUST CO. OF PITTSBURGH, EXECUTORS OF SAID ALEXANDER LAUGHLIN, JR., DECEASED, ASSIGNORS TO CENTRAL TUBE COMPANY, OF PITTSBURGH, PENNSYLVANIA, A CORPORATION OF PENNSYLVANIA.

METHOD AND APPARATUS FOR THE MANUFACTURE OF TUBES.

Application filed March 16, 1925. Serial No. 15,711.

The present invention relates broadly to the manufacture of tubes or pipes, and more particularly to the manufacture of so-called hot-welded, butt-welded tubes, the term "tubes" being used throughout the specification and claims in its generic sense.

At the present time, the usual practice of producing tubes of the general character herein contemplated, is to form the tube in comparatively short lengths from flat strip or skelp. The skelp is first heated to the required temperature, and then engaged at one end by tongs over which is passed a bell-shaped die. The end of the tongs away from the skelp is then attached to a draw chain and, the die being held stationary, the tongs and skelp are successively pulled through the die. The effect of this is to form the skelp into a tube, at the same time bringing the heated edges together, producing a weld. This operation limits the length of tube which can be formed from one piece of skelp both because of the room required by a draw bench with chain thereon, of sufficient length to draw a substantially longer tube, and also because in drawing tubes of longer length than those now customarily drawn, the heated strip tends to burn out the die after a limited length of tube has passed through it, thus causing the last portion of the strip passing through the die to be defective in the weld.

Butt weld tubes of small diameter have been manufactured commercially by a continuous process by which the strip is drawn from coils through a comparatively long heating zone and passed through welding rolls. In this operation, the end of each coiled strip is attached to the forward end of another strip which is successively drawn through the furnace and welding rolls. This operation is applicable to a few sizes of tube but in the sizes of butt welded tubes which are most used, it is commercially impracticable.

I am well aware that the butt welding of tubes in rolls is old in the art of tube manufacture but heretofore no effective means have been found for introducing the heated strip into the rolls and my invention accomplishes this, practically and economically. My invention eliminates the necessity of a draw-bench with a chain thereon and the use of bells or dies, thereby doing away with considerable labor at present required for drawing butt welded tubes and making a great saving in ground space. By eliminating the die, my invention permits the formation of tubes of any desired length with a uniform quality of weld throughout, inasmuch as the rolls are not subject to deterioration as the heated strip passes through them. By its ability to make tubes of a longer length which may subsequently be cut into desired lengths, the present invention very materially reduces the amount of scrap produced in finishing the tube. Where tubes are drawn in short lengths, cuts must be made from both ends, to secure finished tubes of proper quality, and it will be readily seen that if a tube of double or treble the length is drawn and subsequently cut into two or three marketable lengths, the amount of defective pipe cut from the ends will be only one-half or one-third that produced from the shorter welded tube.

In the accompanying drawings there are shown, for purposes of illustration only, certain preferred embodiments of the present invention, it being understood that the drawings do not define the limits of my invention, as changes in the construction and operation therein disclosed may be made without departing from the spirit of the invention or scope of my broader claims.

In the drawings:

Figure 1 is a top plan view, more or less diagrammatic, illustrating one embodiment of the invention, the delivery end of the furnace being shown on horizontal section;

Figure 2 is a side elevation of the apparatus shown in Figure 1, the discharge end of the furnace being illustrated in vertical section;

Figure 3 is a view corresponding to Figure 1, illustrating another slight embodiment of the present invention;

Figure 4 is a top plan view, largely diagrammatic, illustrating the delivery and cooling mechanism for the formed tubes;

Figure 5 is a detail view on an enlarged scale, partly in section and partly in side elevation, of a portion of the magnetic feeding means; and Figure 6 is a detail sectional view of the blast producing means.

In carrying out the present invention, there may be provided a furnace 2 having an outlet opening 3 through which the skelp is adapted to be drawn when it has been heated to the desired temperature within the furnace. In Figures 1 and 2, I have illustrated the ends 4 of a plurality of pieces of skelp from which tubes are to be formed. In the drawings, the ends of these pieces are illustrated as having been preformed, as for example, by bending into substantially circular shape, to facilitate their entry into the forming means. This preliminary shaping may, however, be accomplished in any desired manner.

Mounted exteriorly of the furnace and adapted to travel transversely thereof in front of the opening 3 into position to cooperate successively with the different pieces of skelp is a frame 6 having mounted thereon one or more pairs of shaping and/or welding rolls 7. These rolls are preferably mounted to rotate about vertical axes and are intergeared for simultaneous rotation, as indicated in dotted lines in Figure 1. The rolls may be driven by a suitable motor 8 driving a pulley 9 connected by suitable bevel gears 10 to the shaft carrying one of the rolls 7.

Mounted in front of the rolls 7 between the furnace and the rolls is a feeding mechanism conveniently comprising spaced rolls 11 carried by shafts 12 and intergeared for simultaneous rotation by gears 13. The shafts 12 may be driven through the medium of an intermediate shaft 14 carrying one of the gears 13 at one end and a driving gear 15 at the opposite end, the gear 15 in turn meshing with a driving pinion 16 on the pulley shaft 17.

The ends of the shafts 12 preferably terminate adjacent, but in slightly spaced relationship to the ends 18 of a U shaped core 19. This core may be provided with any desired means for creating a magnetic flux therethrough, such means preferably comprising a coil 20 on each of the legs of the core. The core 19 may be supported in any desired manner, as by a suitable standard 21 separated from the frame 6 by non-magnetic material 22, as for example, a fiber pad. The shafts 12 will also preferably be journaled in non-magnetic bushings 23, as for example, brass, or in a non-magnetic frame, for preventing the transmission of magnetic flux to the supporting frame. In like manner, either the intermediate gear 13 on the shaft 14, or all of the gears may be constructed of non-magnetic material to prevent bridging the shafts 12.

By reason of the construction described, it will be apparent that if a magnetizable material is placed in contact with either of the rolls 11 or across both rolls, it will be held in contact therewith to an extent determined by the strength of the coils 20. By providing coils of sufficient size, the amount of attraction between the rotating rolls 11 and such magnetic material as may be placed in contact therewith may be great enough, for example, to easily effect movement of a piece of steel attached to the end of a heated piece of skelp into the pass of the forming rolls 7. This operation may be conveniently accomplished by the use of tongs 24 which grip one end of the piece of skelp to be withdrawn from the furnace and are locked in gripping position, as for example, by a ring 25, which is slipped over the ends of the handles. The tongs may thereupon be dropped over the rolls 11, the tong handles forming a flow path of relatively low resistance for the magnetic flux, whereby the handles are held in contact with the rolls to such an extent that rotation thereof will direct the same through the entering guide 26 and into the pass between the rolls 7.

The tongs, having entered the rolls 7, have a sufficient momentum, with the heated strip attached thereto, to bring the formed front end of the strip into contact with the rotating rolls 7 by which the strip is gripped and drawn through, at the same time forming the flat strip into a tube. It will be understood that the magnetic feeding means need not necessarily be in the form of rolls, although such rolls are preferred, and that one or more rolls may be used as desired.

In Figures 1 and 2 of the drawings, I have illustrated this magnetic feeding means as being duplicated on the delivery side of the forming rolls 7, parts corresponding to parts already described being indicated by the same reference characters having a prime affixed thereto. Inasmuch as the magnetic roll or rolls exert no influence on the heated skelp, the pull on the skelp ceases when the tongs have passed over the roll or rolls 11 and as it is possible, in some cases, that the momentum of the tongs and strip will be insufficient to cause the strip to advance sufficiently to be engaged by the rolls 7, this second set of magnetic rolls is provided to assure such contact, by providing a secondary pulling force. Where such a duplication of the feeding means is made, the relative locations of the two feeding means will be such that the second means engages the tongs before they leave the first means, thereby insuring continued travel of the skelp into and through the rolls 7. It will be apparent that after the end of the skelp has been properly entered between the rolls, the rotation of the rolls, which is in the direction indicated by the arrows a, will be such as to feed the skelp therethrough.

The rolls 7 may conveniently be of such shape as to not only bring the edges of the heated skelp into contact to initiate the weld, but also exert sufficient pressure to thereafter complete the weld.

The formed tubes upon leaving the forming means, enter a guide 27 for diverting the same into an entering guide 28 leading to one or more pairs of sizing and straightening rolls 29 adapted to be driven at any desired speed. In Figures 1 and 2, one pair of such rolls is illustrated, while in Figure 4, I have shown two pairs of rolls. After leaving these rolls, the tube passes through a delivery guide 30 onto a roll-off plate 31 of any desired construction. This plate then discharges onto a cooling rack 32 across which the tubes are caused to travel by endless chains 33 having suitable angles or lugs 34 for engaging the tubes and feeding the same. The chains 33 may be driven in any desired manner, as for example, by a motor 35 and are preferably supported in channels 36 for preventing undue sag.

In the embodiment of the invention illustrated in Figure 3, there is shown only a single feeding unit on the entering side of the forming rolls 7. Intermediate this feeding means and the furnace, however, there is indicated a supplemental heating means 38 which may conveniently comprise burners adapted to direct blasts containing oxygen against the edges of the heated skelp immediately prior to its passage to the forming means to thereby further increase the temperature should such action be deemed desirable. These burners may have slots or openings 39 preferably in substantially the plane of the strip to direct a blast directly against the edges thereof, as clearly shown in Figure 6.

To those skilled in the art it will be apparent that the provision of magnetic feeding means which may be in the form of single rolls, or a plurality of rolls, on one or both sides of the forming rolls, or in any other form capable of producing the desired movement of the skelp, constitutes a material improvement in apparatus of this character, as it relieves the operator from any manual work in connection with starting the strips and makes possible the use of forming rolls, which are highly desirable due to their greater length of life and due to the fact that they do not impose the strain on the tube to which it is subjected by the usual operation of the drawing bench in combination with forming dies or bells. Furthermore, the feeding means becomes automatically operable merely upon the dropping of the tongs onto the same, making it unnecessary for the operator to perform any manual operation in connection therewith. It will be understood that where desired the tongs may be eliminated entirely and suitable tags of magnetic material utilized for effecting the feeding movement through the action of the magnetic feeding rolls, the tags being long enough to permit this operation.

Further advantages of the present invention arise from the location of the coils 20 entirely to one side of the path of the heated material whereby they may be constructed of any desired size while being maintained entirely free from the action of slag and out of contact with the deteriorating influence of the heat from the hot material being handled.

I claim:

1. Apparatus for the manufacture of tubing, comprising a furnace, forming means, and magnetic means intermediate the furnace and forming means constructed to permit free operation of the tongs and effective for feeding the material to the forming means.

2. Apparatus for the manufacture of tubing, comprising a furnace, forming means, and spaced magnetic feeding rolls intermediate the furnace and forming means and so positioned as to all be substantially tangent to the line of feed of the tubing and on the same side thereof.

3. Apparatus for the manufacture of tubing, comprising a furnace, forming rolls, and magnetic feeding means entirely at one side only of the pass through said rolls and intermediate the furnace and forming rolls.

4. Apparatus for the manufacture of tubing, comprising a furnace, forming rolls, magnetic feeding means intermediate the furnace and forming rolls, and a guide intermediate the forming rolls and feeding means.

5. Feeding mechanism for tube forming machines, comprising a magnetic roll, and means located laterally of said roll for magnetizing the same.

6. Feeding mechanism for tube forming machines, comprising a pair of spaced rolls, and means entirely laterally of said rolls for magnetizing the same.

7. The method of manufacturing tubing, comprising shaping the end of a piece of skelp, securing thereto a magnetizable material, placing said material in contact with a magnetic feeding means which is ineffective on the skelp, and feeding the same into a forming means.

8. The method of manufacturing tubing, comprising shaping the end of a piece of skelp, securing thereto a magnetizable material, placing said material in contact with a magnetic feeding means, and feeding the same into a forming and welding roll pass.

9. Apparatus for the manufacture of tubing, comprising a furnace, forming means, and a magnetic feeding roll intermediate the furnace and forming means.

10. Apparatus for the manufacture of tubing, comprising a furnace, forming rolls, and a magnetic feeding roll intermediate the furnace and forming rolls.

11. Tube bending and forming apparatus, comprising forming rolls having a forming pass therebetween, and a plurality of magnetic feeding rolls arranged substantially in the path of travel of material passing through said pass for effecting movement of the material relatively thereto.

12. Feeding mechanism for tube forming machines, comprising a pair of spaced rolls, and a U-shaped magnet located laterally of said rolls for magnetizing the same.

13. Apparatus for the manufacture of tubing comprising a furnace, forming means, and freely accessible magnetic means intermediate the furnace and forming means constructed to permit the unrestricted operation of tongs and effective for feeding the material to the forming means.

14. Apparatus for the manufacture of tubing comprising a furnace, forming means and magnetic feeding rolls intermediate the furnace, and forming means so positioned as to be substantially tangent to the line of feed of the tubing, said feeding rolls being unobstructed with respect to their upper surfaces.

15. Apparatus for the manufacture of tubing comprising a furnace, forming rolls, and magnetic feeding rolls intermediate the furnace and forming rolls accessible by bodily movement of material in a direction substantially normal to the axis of the feeding means.

In testimony whereof I have hereunto set my hand.

ALEXANDER LAUGHLIN, Jr.